United States Patent [19]

d'Alayer de Costemore d'Arc

[11] Patent Number: 4,489,351
[45] Date of Patent: Dec. 18, 1984

[54] ELECTRONIC STILL CAMERA WITH INDIVIDUAL NON-VOLATILE MEMORY UNITS

[75] Inventor: Stephane M. d'Alayer de Costemore d'Arc, Ways, Belgium

[73] Assignee: Staar S. A., Brussels, Belgium

[21] Appl. No.: 419,518

[22] Filed: Sep. 17, 1982

[30] Foreign Application Priority Data

Sep. 28, 1981 [BE] Belgium ............................ 206080

[51] Int. Cl.³ .......................................... H04N 3/14
[52] U.S. Cl. ................................. 358/213; 358/209; 358/335; 358/906; 358/241; 235/460
[58] Field of Search .............. 358/335, 906, 213, 209, 358/214, 241; 365/183; 357/23 C; 235/380, 487, 492, 494, 454, 460; 250/211 R; 350/DIG. 1; 455/600; 360/32, 14.1

[56] References Cited

U.S. PATENT DOCUMENTS

| | | |
|---|---|---|
| 3,336,690 | 8/1967 | Walter et al. |
| 4,057,830 | 11/1977 | Adcock |
| 4,131,919 | 12/1978 | Lloyd et al. |
| 4,195,317 | 3/1980 | Stratton .............................. 360/14 |
| 4,295,154 | 10/1981 | Hata et al. ........................... 358/4 |
| 4,415,937 | 11/1983 | Nishizawa et al. ................. 358/335 |
| 4,420,773 | 12/1983 | Toyoda et al. ..................... 358/335 |
| 4,441,125 | 4/1984 | Parkinson .......................... 358/213 |

FOREIGN PATENT DOCUMENTS

| | | | |
|---|---|---|---|
| 140510 | 10/1979 | Japan ................................ 358/906 |
| 1440791 | 6/1976 | United Kingdom ............... 358/906 |

*Primary Examiner*—Gene Z. Rubinson
*Assistant Examiner*—Robert Lev
*Attorney, Agent, or Firm*—Leydig, Voit, Osann, Mayer and Holt, Ltd.

[57] ABSTRACT

An electronic still camera is disclosed having an optical system, a transducer in the form of CCD image sensors for producing image representing signals responsive to an image focused on the sensors by the optical system, an actuable shutter control and circuits in the camera for transmitting image representing signals from the transducer to a recording device having a plurality of individual no-volatile integrated circuit memory units. A controller means in the form of a microprocessor is operated by a shutter control and controls the transmission of image representing signals from the transducer through the circuits to record only a separate single image in each of the individual memory units.

13 Claims, 3 Drawing Figures

ELECTRONIC STILL CAMERA WITH INDIVIDUAL NON-VOLATILE MEMORY UNITS

TECHNICAL FIELD

The present invention relates to cameras in which the recording of images is effected completely electronically.

BACKGROUND ART

In recent years, video cameras have been produced using integrated circuits of the type known as charge coupled device (CCD) and an electronic system for read out and electronic transmission of image representing signals from the CCD circuits.

This technique, which can easily be applied to a conventional photographic camera, allows the use of a magnetic medium for recording the image representing signals instead of a chemically processed photographic film.

Use of a magnetic recording medium (tape or disc) in an electronic camera has the great advantage of permitting immediate reproduction of the image on a television screen but simultaneously has important drawbacks when compared with photographic films, e.g., no cutting is possible for editing and there is no random visual access.

Integrated circuit memories have come to be widely used in electronic equipment of all kinds and their sale price, presently, is only one/tenth of the sale price of only three or four years ago. In addition, the capacity of integrated circuit memories has been so greatly increased that they are now frequently used in electronic equipment, such as computers, in lieu of magnetic tape or discs.

DISCLOSURE OF THE INVENTION

The principal object of this invention is to provide an improved image recording device for an electronic still camera having a plurality of individual integrated circuit memory units for recording individual images so that access to the different images will be very easy for the user.

A related object is to provide an image recording device for an electronic still camera having a plurality of individual integrated circuit memory units, each of which is replaceable.

Another object is to provide an image recording device for an electronic still camera utilizing individual integrated circuit non-volatile memory units.

A further object is to provide, in an electronic still camera, an image recording device having individual integrated circuit memory units and controller means in the electronic camera for transmitting signals representing an individual image to be recorded only in a selected memory unit.

BRIEF DESCRIPTION OF THE DRAWING

Further objects will be apparent from the following description taken in conjunction with the accompanying drawings, in which:

FIG. 3 represents a circular cassette for memory units.

BEST MODE FOR CARRYING OUT THE INVENTION

Figure 1:
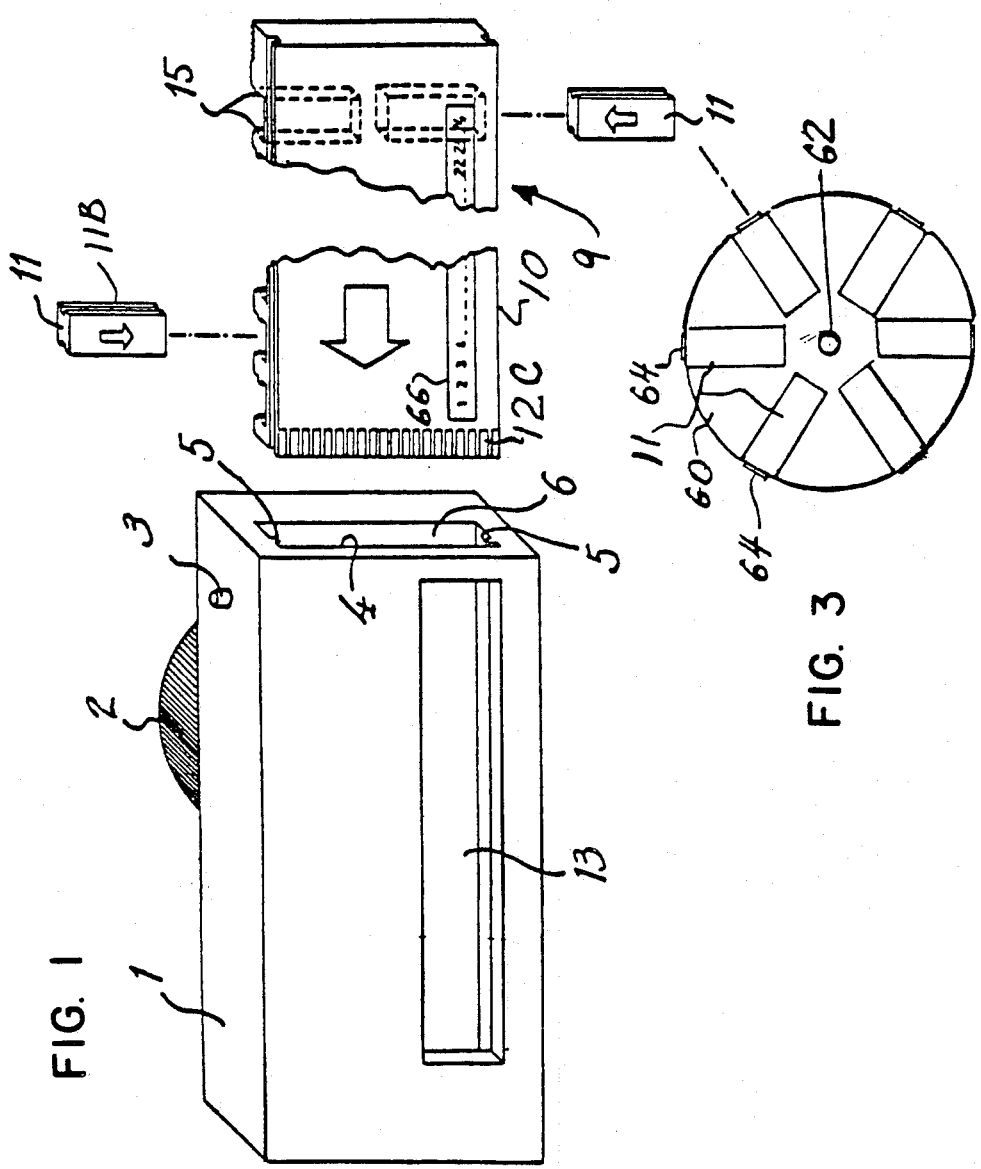
FIG. 1 represents an electronic still camera having a cassette of individual integrated circuit memory units constructed according to the present invention.

Referring to FIG. 1, an electronic still camera 1 is illustrated having a lens 2, a shutter-button 3 and an image recording device 9.

Figure 2:
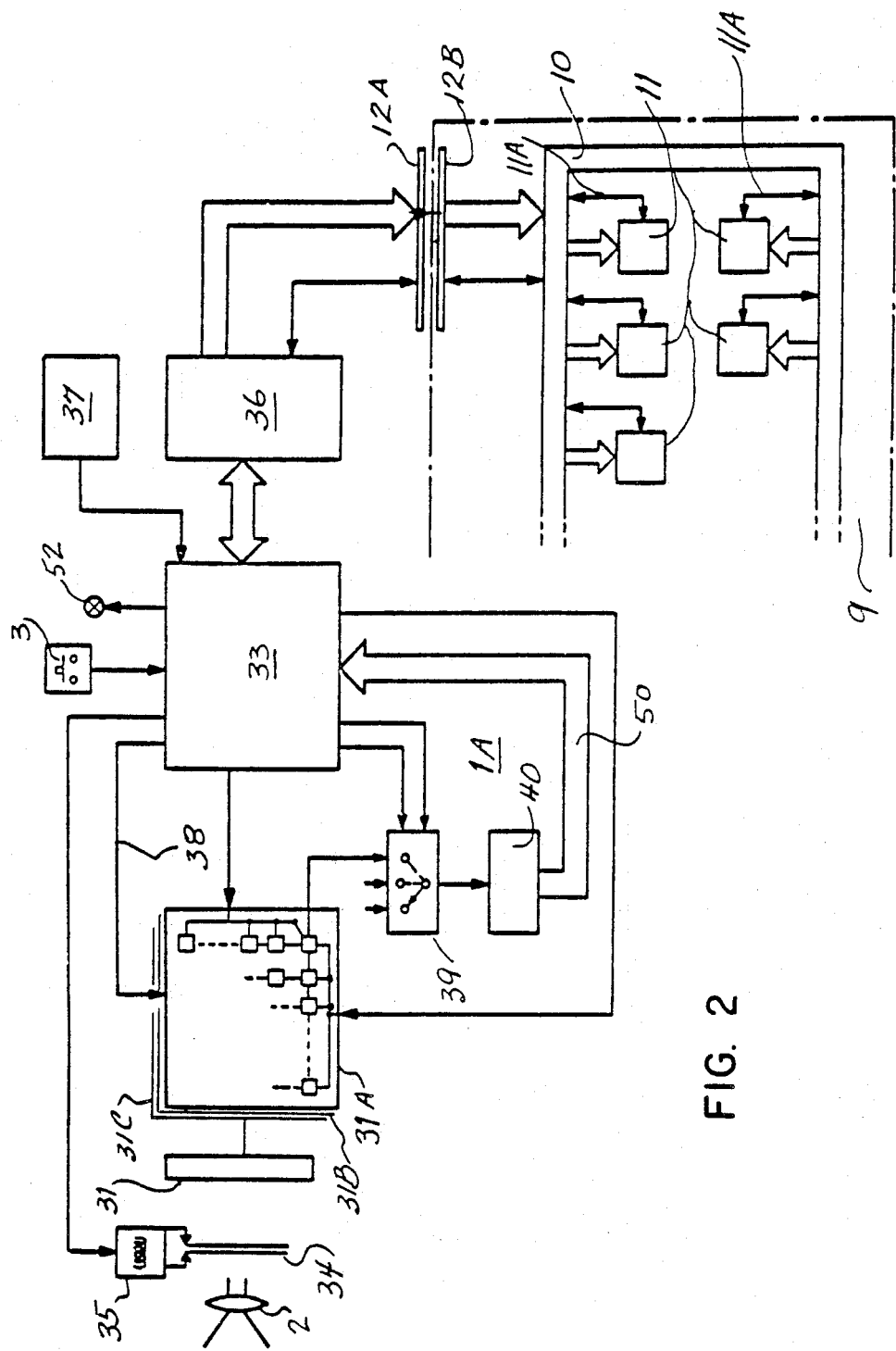
FIG. 2 represents schematically a circuit diagram of components and circuits of the electronic still camera and image recording device shown in FIG. 1.

Shown in FIG. 2 in schematic diagram form are the optical and electronic components of the still camera 1 and of the circuit means of the image recording device 9 and the interfacing connection 12A, 12B between such electronic components and circuit means. As illustrated, the camera 1 includes an optical lens 2 and circuits 1A including a transducer 31 in the form of charge coupled devices (CCD) for producing color image representing signals responsive to an image focused thereon by the lens 2. The duration of the image and the amount of light transmitted to the transducer 31 may be controlled by a conventional shutter 34 powered by electromagnetic means 35 activated by the shutter-button 3 in a conventional manner.

Such transducer 31 includes three CCD circuits 31A, 31B, 31C which store signals responsive to the impinging light and may be read out via analog registers. Such photosensitive sensors 31A, 31B, 31C (one set is indicated schematically—side view) are constructed to produce and store signals responsive to blue, green and red portions of the image focused on the transducer, as is well known in the art.

In the camera of this invention, the CCD transducer 31 is operated by a controller means 33, herein shown as a microprocessor under program control. In response to actuation of the shutter-button 3, power is supplied from the source 37 to the controller means 33 which, first of all, resets all sensors of the transducers 31A, 31B, 31C by a control signal "CLEAR CCD" transmitted by the line 38. Then the shutter 34 is powered by its electromagnetic means 35 to allow sensors to receive light. Then the controller means 33 applies control and clock signals to the CCD transducers 31 to cause reading out of the sensors. During this sequence sensors are read out, line by line, using the conventional interline transfer approach. Once one of the transducers 31A, 31B, 31C has been read out, the electronic switching means 39 powered by the controller means ensures read out of the next transducer. Those signals are applied to an "analog to digital" converter 40, controlled by the controller means 33 for being read out by the CPU through DATA line 50. Those signals are then converted into serial signals and coded for being transmitted to the peripheral memory control unit 36. Said control unit is a standard peripheral device matching with the characteristics of the microprocessor used as controller means. A buffer can be installed inbetween those components to allow transmission of the data to the recording device 9 of the camera 1 at a desired rate.

According to this invention, the image recording device 9 provided for the camera comprises a cassette 10 of individual integrated circuit memory units 11 and the controller means 33 is utilized for transmitting image representing signals through circuit means connecting the camera to the individual integrated circuit memory units 11 to record only a separate single image in each of individual memory units 11.

Referring to FIG. 1, on one face of the camera 1 there is provided an aperture 4 which allows a cassette 10 to be introduced into the camera body 6, the cassette 10 carrying a set of removable integrated circuit memory units 11.

An internal wall of the camera body 6 is formed with grooves 5 designed for guiding the cassette 10 upon introduction thereof, preferably the grooves 5 being unsymmetrically arranged so that the cassette 10 can be inserted in only a single orientation.

The cassette 10 has circuits 11A for transmitting signals to the individual memory units 11 which may be permanently connected to circuit means 1A in the camera. Preferably, in keeping with this invention, interconnection is made between the cassette circuits 11A and the camera circuit means 1A by a separable connector 12A, 12B including contacts 12C on the exterior of the cassette 10 adapted to engage mating contacts (not shown) within the camera body 6. The cassette circuits 11A are provided to the individual memory units 11 so that image representing signals may be transmitted to selected individual memory units 11 and so that signals may be read out of the individual memory units 11 while mounted in the cassette 10, whether in the camera 1 or without.

In keeping with the invention, the memory units 11 are standard integrated circuits packaged to be removably mounted in the cassette 10. Such memory units 11 are preferably of the non-volatile type, such as magnetic bubble devices, so that the memory units 11 may be removed from the cassette 10 without loss of recorded image data.

For the purpose of mounting the memory units 11, the cassette 10 comprises a set of slots 15 permitting the memory units to be guided and maintained in the cassette 10. In a preferred embodiment, the cassette 10 contains twenty-four memory units and these are mounted in two rows of twelve. As in the instance of the mounting of the cassette 10 within the camera body 6, a separable means of connection including terminals 11B on the memory units 11 is provided to connect the integrated circuits of the memory units 11 to the cassette circuits 11A and the camera circuits 1A. The integrated circuits of the memory units 11 are interconnected with the camera circuits 1A automatically as an incident to inserting the memory units 11 into the slots 15 of the cassette 10 and the cassette into the camera body 6.

As above indicated, the memory control unit 36, controlled by the controller 33, effects the selection of an individual memory unit 11 in which the image "shot" by the user, upon actuation of the shutter-button 3, will be recorded. In the preferred embodiment, the microprocessor of the controller 33 is programmed in such a way as to select the memory units 11 in increasing order (1 to 24 for example) and a signal light 52 may be provided on the camera to warn the user when the last available memory has been used.

The circuits 1A of the camera 1 and memory control unit 36 are also constructed so that if one of the integrated circuits of the memory units 11 is defective, the controller 33 will automatically select the first next following memory unit; said selection may be effectuated by testing the interface with the terminals 11B of the memory units 11, which remains open in case a particular memory unit 11 is defective or absent. Thus, the controller also provides a means for insuring recording of an image in the next available memory unit 11 if one of them has been withdrawn or is defective.

If the user desires to retain only some of the images "shot" and recorded in a cassette 10, he merely needs to extract the corresponding memory unit 11 from the cassette 10 and the cassette is immediately reusable. The content of the integrated circuit memory units 11 being erasable, the memory units may be used and reused as desired.

As an alternative to a cassette 10 as shown in FIGS. 1 and 2 which incorporates a separable interfacing connection 12A, 12B as there indicated, the memory units 11 may be located on the periphery of a circular cassette 60, as shown in FIG. 3, which is pivotable around a central axis 62 so as to position a single memory unit 11 and its terminals 64 in front of a single contact set located in the camera body 6 and thus provide means for interfacing the circuit means 11A within the cassette 60 with the circuits 1A of the camera 1. Rotation of such a cassette 60 may be caused through a mechanical device once the image "shot" through the lens 2 has been recorded in a memory unit 11.

As shown in FIG. 1, the cassette 10 has means for indicating the memory units available for image recording, shown, for example, as an LCD display 66 of numerals from 1 to 24 representing the individual memory units 11 of the cassette 10. Such a display 66 is connected by circuit means 11A of the cassette 10 to the controller 33 and is actuated to display a particular numeral only when the corresponding memory unit 11 is present in the cassette 10. It is also possible to provide that once image data has been recorded in one of the memory units 11, the corresponding numeral in the display 66 will be switched off so as to alert the user that the memory unit has been used.

I claim:

1. An image recording device for an electronic still camera having an optical system and a transducer comprising CCD image sensors for producing image representing signals responsive to an image focused thereon by said optical system, and circuit means for transmitting said signals to said recording device, said device comprising:
    a cassette of individual integrated circuit memory units for mounting in said camera, said cassette including:
    a plurality of individual integrated circuit non-volatile memory units received in said cassette; and
    means for electrically connecting the integrated circuits of said memory units with said camera circuit means to receive and record said image representing signals.

2. An image recording device according to claim 1, said cassette having one portion of a separable connector connected to said cassette circuit means and adapted to be interconnected with said camera circuit means to receive said image representing signals.

3. An image recording device according to claim 2, said cassette having contacts adapted to engage contacts in said camera when mounted therein providing a separable connector to interconnect said camera circuit means with said cassette circuit means.

4. An image recording device according to claims 2 or 3 wherein said plurality of individual integrated circuit memory units are removably mounted in said cassette and have means for interconnecting and disconnecting the individual integrated circuit memory units with said cassette circuit means upon mounting and removal.

5. An image recording device according to claim 4, said cassette having a plurality of slots, and each of said memory units being slidable in and removable from said slots for mounting in said cassette.

6. An image recording device according to claim 1, said cassette being circular in shape and having individual memory units at the periphery thereof, said individual memory units having terminals adapted to interconnect with said camera circuit means.

7. An image recording device according to claim 6, said circular cassette being rotatable about its central axis to position the terminals of a single memory unit opposite one single contact set of said camera circuit means.

8. In an electronic still camera,
   an optical system;
   a transducer comprising CCD image sensors for producing image representing signals responsive to an image focused thereon by said optical system;
   an actuable shutter control;
   circuit means in said camera for transmitting image representing signals from said transducer;
   a recording device including: a plurality of individual non-volatile integrated circuit memory units, and circuit means electrically connecting said individual integrated circuits with said camera circuit means to receive and record image representing signals; and
   controller means responsive to actuation of said shutter control and controlling the transmission of image representing signals from said transducer through said circuit means to record only a separate single image in each of said individual memory units.

9. An electronic still camera according to claim 8 wherein said camera circuit means includes a buffer memory, and said image representing signals are transmitted to said memory units through said buffer memory under the control of said controller means.

10. An electronic still camera according to claim 8 wherein said controller means includes a microprocessor having clock outputs controlling read out of said CCD image sensors to produce image representing signals.

11. An electronic still camera according to claim 8 wherein said controller means includes a programmable microprocessor programmed to control the transmission of image representing signals to selected memory units.

12. An electronic still camera according to claim 11 wherein said recording device includes a display for representing the state of the individual memory units to indicate which memory units are available for recording images.

13. An electronic still camera according to claim 8, said controller means including a microprocessor programmed to check the state of the integrated circuits of the individual memory units.

* * * * *